Patented Oct. 7, 1930

1,777,960

UNITED STATES PATENT OFFICE

SIDNEY M. CADWELL, OF LEONIA, NEW JERSEY, ASSIGNOR TO THE NAUGATUCK CHEMICAL COMPANY, A CORPORATION OF CONNECTICUT

PROCESS OF VULCANIZING RUBBER AND PRODUCTS OBTAINED THEREBY

No Drawing.   Application filed February 1, 1921.   Serial No. 441,691.

This invention relates to compounding rubber and to products obtained thereby. It is more particularly directed to compounding of rubber for vulcanization at various temperatures employing various vulcanizing ingredients and to the products therefrom.

It is the usual practice in forming compounds with rubber, particularly in compounding vulcanizing ingredients therewith, to effect such compounding by milling which usually occurs at elevated temperatures. There are many substances which when incorporated with rubber at such elevated temperatures are themselves injuriously affected or affect the rubber injuriously. For example, combinations of highly reactive vulcanizing ingredients in sufficient quantity to effect vulcanization, which may injure the rubber by causing it to "burn" on the mill. In the present specification the broad term "vulcanizing ingredient" is applied both to a material which of itself can effect vulcanization and also to a material which in combination with other materials can assist in vulcanization. The more specific term "vulcanizing agent" is applied only to a material which of itself is capable of effecting vulcanization.

Accordingly the principal object of the present invention are to provide a process which shall permit the compounding of various vulcanizing ingredients with rubber without injury to themselves or to the rubber and to provide a series of rubber products therefrom having improved physical characteristics.

The invention broadly comprises a process of vulcanizing rubber in which a powerful combination of vulcanizing ingredients is so introduced or incorporated in the rubber that not more than a part of the entire combination is present in any one portion of rubber until the preliminary mixing and/or other operations have been substantially or entirely completed, then when desired completing the entire vulcanizing combination in the rubber, and vulcanizing. It further comprises incorporating in a body of rubber a part of a powerful combination of vulcanizing ingredients, introducing the balance of the ingredients by diffusion or migration, and vulcanizing. It further comprises impregnating a solid mass containing rubber with a non-gaseous halogen-free vulcanizing ingredient substantially without changing the form of the mass, and vulcanizing the rubber. It further comprises introducing parts of a powerful vulcanizing combination into different masses of rubber, sheeting out the masses of rubber, alternately plying the sheets, permitting the complete powerful vulcanizing combination to be formed throughout the plied up material by intermigration of ingredients between the plies, and vulcanizing.

In carrying out the invention in its preferred form 100 parts of rubber, 10 parts of zinc oxide, 6 parts of oxy normal butyl thiocarbonic acid disulphide and 3 parts of sulphur are compounded on the mixing mill. This stock may be designated as A. The oxy normal butyl thiocarbonic acid disulphide is a liquid and constitutes a vulcanizing ingredient. Similarly another rubber compound may be mixed containing rubber 100 parts, zinc oxide 10 parts, sulphur 3 parts, and aniline 4 parts. This compounded rubber may be designated as B. This compound will not vulcanize at moderate heat during a considerable period. Aniline is a liquid and constitutes another vulcanizing ingredient. Compounds A and B after being separately mixed with the vulcanizing ingredients as indicated are preferably blended in any desired manner as by passing through mixing rolls. The blending may be performed in any other desired manner than by mixing rolls, for example a hydraulic press may be used, or the two compounds may simply be laid on top of one another. The more intimate contact insures a more rapid absorption of the ingredients of compound A by compound B and vice versa. An article formed therefrom and allowed to stand for one week at 70° F. approximately (ordinary room temperature) is completely vulcanized, the vulcanizing ingredients in each stock mutually permeating and impregnating the other stock. No heat is necessary for vulcanization although if heat is applied the vulcanization is hastened. It is pointed out generally where heat is applied it is desirable to allow compounds, as A and B to stand about one day at ordinary temperature in order to allow impregnation of the vulcanizing ingredients throughout the stock before application of heat for vulcanization. It will be observed in the process just recited and those that follow that the form given the rubber is substantially unchanged by the process whereby permeation of the substances of compound A pass into those of compound B and vice versa. It will also be noted in the processes recited hereinafter that the form of the rubber whether as a sheet or in the form of thread or other articles is substantially unchanged by the impregnating process.

As a modification of the above procedure a rubber compound such as A having a thickness for example of .025 inches may be prepared and such material may then be allowed to stand in a room containing aniline fumes for approximately four days, whereupon vulcanization is completed; or such compound may be treated with liquid aniline for a day or so, enough aniline being absorbed to cause the cure to become complete upon removal therefrom. If desired a material such as aniline may be employed to impregnate a fabric, the fabric being subsequently coated by calendering, for example with the compound A. The combination of fabric and rubber upon standing for several days vulcanizes satisfactorily.

Another specific example of the process is as follows: 100 parts of rubber, 6 parts of oxy ethyl thiocarbonic acid disulphide, 3 parts of sulphur and 10 parts zinc oxide are combined, the oxy ethyl thiocarbonic acid disulphide constituting a solid vulcanizing ingredient, and a second compound is formed by combining 100 parts rubber, 4 parts aniline, 10 parts zinc oxide and 3 parts sulphur, the aniline in the latter compound forming a liquid vulcanizing ingredient. These compounds are alternately plied in superposed sheets, pressed together and allowed to stand at room temperature at approximately 70° F. for one week, when vulcanization is complete. It will be understood that where the vulcanization temperature is higher a correspondingly shorter time is necessary for vulcanization. At 100° C. after standing for approximately a day as before pointed out, the above masses react to vulcanize in approximately 30 minutes.

As another example of the process 100 parts of rubber, 2 parts of zinc oxide, 2 parts of sulphur, and 4 parts of oxy normal butyl thiocarbonic acid disulphide are mixed to form compound A. 100 parts of rubber, 2 parts zinc oxide, 2 parts of sulphur and 4 parts of aniline are mixed to form compound B. These stocks are blended preferably as indicated above and if rolled out to form thin sheets .025 inches thick for thread stock, partial vulcanization, sufficient to permit handling of the material, may be secured in approximately two minutes at 275° F. Thereafter if such partially vulcanized material be placed in a chamber at 90°–100° F. vulcanization may be completed in approximately 1 day. It is obvious that if greater speed of vulcanization is desired, the entire vulcanization, in the present or the other examples, may be accomplished at high temperatures, that is, at normal hot vulcanizing temperatures from about 240° to 286° F. or even higher.

If it is desired to prepare a compound containing a vulcanizing ingredient or ingredients which may be milled at a high temperature and then treated with another vulcanizing ingredient, the following procedure may be carried out: 100 parts rubber, 10 parts zinc oxide, 3 parts sulphur and 3 parts oxy normal butyl thiocarbonic acid disulphide are combined by milling and calendering. The compound is then placed in a receptacle containing aniline fumes or such vulcanizing ingredient is otherwise applied as above to effect complete vulcanization. It is possible instead of employing the aniline later to compound it first with rubber and then treat an article formed therefrom with oxy normal butyl thiocarbonic acid disulphide by dipping or painting the latter material upon the article.

As a modification of the above procedure 100 parts of rubber, 3 parts of zinc butyl-xanthogenate, 10 parts of zinc oxide and 3 parts of sulphur are compounded to form one rubber compound, and this material is then painted with aniline and allowed to stand at approximately 70° F. whereupon vulcanization occurs shortly.

As another example of the process 100 parts rubber are combined with 3 parts zinc butyl xanthogenate and thoroughly mixed to constitute one stock, 100 parts of rubber, 10 parts zinc oxide, 3 parts of sulphur and 4 parts para toluidine are combined to constitute a second compound. The first and second compounds are then applied to one another and on standing at approximately 70° F. vulcanization is completed within one week or in 30 minutes approximately at 100° C.

As another example of the process, 100 parts rubber are combined with 10 parts of zinc oxide, 3 parts of sulphur and 3 parts of oxy normal butyl thiocarbonic acid disulphide. This material after being compounded is treated by suspension in ethyl amine gas at approximately 70° F. for one week at the end of which time vulcanization is found to be complete.

As another example of the process 100 parts rubber, 10 parts zinc oxide, 3 parts of sulphur and 3 parts of oxy ethyl thiocarbonic acid disulphide are combined and thereafter the rubber is suspended in ethyl amine gas at ordinary temperatures for one week at the end of which time vulcanization is complete.

The specific examples given above indicate the use of sulphur, zinc oxide and an amine. It is pointed out that it is not essential that these three reagents be added to effect vulcanization although in the examples given the action occurs more readily in the presence thereof. For example zinc butyl xanthogenate cures without the presence of zinc oxides; aniline and sulphur alone being able to effect vulcanization in conjunction with the xanthogenate. Or the xanthogenate will vulcanize without the addition of an amine, zinc oxide and sulphur being alone employed.

Among other materials which may be employed in carrying out the process herein indicated replacing materials herein noted are the following:—In the class of thiocarbonic acid disulphides may be mentioned the oxyethyl, oxybutyl, oxyamyl, oxymethyl compounds and the analgous compounds acetyldisulphide, benzoyldisulphide, and dithiobenzoyldisulphide. In the class of xanthogenates may be mentioned the mercuric ethyl, potassium amyl, zinc amyl, copper ethyl, zinc ethyl, barium ethyl, sodium methyl, lead methyl, zinc metyl, lithium ethyl, magnesium ethyl, calcium ethyl, potassium butyl, zinc butyl, potassium ethyl, sodium ethyl, and lead ethyl compounds. The reactions of these compounds will naturally vary according to the nature of the substituted group and metal, both in the speed of vulcanization and in the physical properties of the vulcanizate.

Oxy normal butyl thiocarbonic acid disulphide is both an accelerator and a vulcanizing agent as distinguished from an accelerator only and when present in sufficient amounts will cure without sulphur. It has been found to cure without the addition of an amine. In general where an agent of this type is capable of vulcanizing rubber unaided when present in sufficient quantity it will be observed that the proportions should be so adjusted that the rate of vulcanization is sufficiently slow to avoid prevulcanization or "burning" upon compounding, but the proportions being such that rapid vulcanization will occur when another cooperating vulcanizing ingredient is thereafter applied. The presence of zinc oxide in rubber stocks is not necessary on all occasions, but a zinc compound is present when materials of the class of oxy normal butyl thiocarbonic acid disulphide are used. Generally better results are obtained when zinc oxide is included in the compounded stock. A transparent stock may be obtained by reducing the amount of zinc oxide to 0.5%.

It will be observed that in general the materials such as oxy normal butyl thiocarbonic acid disulphide and zinc butylxanthogenate mentioned herein are derivatives of carbon disulphide that may be employed with amines. It is pointed out however that various other vulcanizing ingredients separately applied may be employed, and that the invention is not restricted to the use of specific materials.

The rubber products produced by the process are found to possess in general desirable physical properties. The process is simple and effective and avoids the use of expensive apparatus, permits the use of highly active vulcanizing combinations and in general accomplishes the objects herein-above set forth. It is particularly pointed out that vulcanization at low temperatures according to the process herein possesses advantages over low temperature processes heretofore known such as sulphur monochloride vulcanization, in that the present process permits accurate control of the degree of vulcanization and hence of the physical properties of the resulting vulcanized rubber. It is also particularly true that ageing of the products of the present process is superior to ageing of the products of the sulphur monochloride cure. Further dyestuffs and fibrous materials such as cotton may be employed without injury in the present process, whereas such use has been prohibited in sulphur monochloride vulcanization.

As many apparently widely different embodiments of this invention could be made without departing from the spirit thereof, for instance, it is clear that where the supplementary vulcanizing ingredient is applied to the surface of the rubber stock, heat may be used at the same time to hasten absorption into the rubber stock and/or to quicken vulcanization, and it will be understood that I do not intend to limit myself to the specific embodiment herein set forth except as indicated in the appended claims.

Having thus described my invention, what I claim and desire to protect by Letters Patent is:

1. A process of treating rubber which comprises impregnating a mass containing rubber with a non-gaseous halogen-free vulcanizing compound, substantially without changing the form of the mass, and vulcanizing the rubber.

2. A process of treating rubber which comprises impregnating a mass containing rubber and a vulcanizing ingredient, with another cooperating vulcanizing ingredient, one of said ingredients being organic, substantially without changing the form of the mass, and vulcanizing the rubber at below normal hot vulcanizing temperatures.

3. A process for treating rubber which comprises impregnating a mass containing rubber and an organic sulphur containing vulcanizing ingredient with another cooperating vulcanizing ingredient, substantially without changing the form of the mass, and vulcanizing the rubber.

4. A process of vulcanizing rubber which comprises combining with a mass of rubber a vulcanizing ingredient, combining with a second mass of rubber another vulcanizing ingredient, associating the separately combined masses of rubber and vulcanizing ingredients, and subjecting the same to a suitable temperature for a sufficient length of time to effect vulcanization.

5. A process of treating rubber which comprises combining with a mass of rubber a vulcanizing ingredient comprising an organic sulphur containing compound, combining with a second mass of rubber another vulcanizing ingredient, mixing the separately combined masses of rubber and vulcanizing ingredients, and vulcanizing the admixed masses of rubber.

6. A process of treating rubber which comprises combining with rubber a thiocarbonic acid disulphide as one vulcanizing ingredient, treating the combination with another vulcanizing ingredient, and vulcanizing the rubber.

7. A process of vulcanizing rubber which comprises combining with rubber oxy normal butyl thiocarbonic acid disulphide, and treating the compound with an amine adapted to permeate the rubber.

8. The process of making rubber articles comprising bringing into intimate contact bodies of rubber containing respectively oxy normal butyl thiocarbonic acid disulphide, zinc oxide, and sulphur, and paratoluidine, zinc oxide and sulphur, and allowing vulcanization to proceed.

9. A step in a process of vulcanizing rubber which comprises impregnating a mass containing rubber with a non-gaseous vulcanizing compound, substantially without changing the form of the mass, at a temperature below 100° C.

10. A step in a process of treating rubber which comprises impregnating a mass containing rubber with a low temperature accelerator substantially without changing the form of the mass.

11. A step in a process of vulcanizing rubber which comprises impregnating a mass containing rubber with a halogen-free liquid vulcanizing ingredient at a temperature below 100° C.

12. A step in a process of vulcanizing rubber which comprises impregnating a mass containing rubber and an organic sulphur containing vulcanizing ingredient with another vulcanizing ingredient, substantially without changing the form of the mass.

13. A step in the process of vulcanizing rubber consisting in allowing oxy normal butyl thiocarbonic acid disulphide and paratoluidine to interact in the presence of rubber.

14. The process of making a rubber article comprising calendering to a fabric a sheet of rubber containing zinc oxide, sulphur and oxy normal butyl thiocarbonic acid sulphide, applying to the rubber another sheet of rubber containing sulphur, zinc oxide and paratoluidine, and continuing the building up of such alternate plies to complete the article.

15. As a new product a vulcanized rubber produced from rubber and a vulcanizing ingredient, impregnated with a second vulcanizing ingredient, substantially without changing the form of the mass, said ingredients including an organic accelerator.

16. A process for treating rubber which comprises impregnating a mass containing rubber and an organic sulphur containing vulcanizing ingredient with an accelerator, substantially without changing the form of the mass, and vulcanizing the rubber.

17. A process for treating rubber which comprises impregnating a mass containing rubber and an organic sulphur containing vulcanizing ingredient with an amine, substantially without changing the form of the mass, and vulcanizing the rubber.

18. A process of treating rubber which comprises impregnating a mass containing rubber with a non-gaseous halogen-free vulcanizing compound, substantially without changing the form of the mass, and vulcanizing the rubber at a temperature below 100° C.

19. A process for treating rubber which comprises impregnating a mass containing rubber and an organic sulphur containing vulcanizing ingredient with an accelerator, substantially without changing the form of the mass, and vulcanizing the rubber at a temperature below 100° C.

20. A process for treating rubber which comprises impregnating a fabricated rubber article containing a vulcanizing ingredient with a second vulcanizing ingredient, said ingredients including an organic accelerator substantially without changing the form of the article, and vulcanizing the article.

21. A process for treating rubber which comprises impregnating a fabricated rubber article containing an organic sulphur containing vulcanizing agent with an amine substantially without changing the form of the article, and vulcanizing the article.

22. A process for treating rubber which comprises impregnating a fabricated rubber article containing an organic sulphur containing vulcanizing agent with an amine substantially without changing the form of the article, and vulcanizing the article at a temperature below 100° C.

23. The herein described method of forming a sheet or slab of rubber which comprises superposing one upon the other a plurality of plies of rubber compound, one ply containing sulphur and an adjoining ply an accelerator.

24. The herein described method of forming a sheet or slab of rubber which comprises superposing one upon the other a plurality of plies of rubber compound, one ply containing sulphur and the other an accelerator, and thereafter raising the temperature of the superimposed plies.

25. The herein described method of forming a rubber article which comprises superposing upon each other a plurality of plies to secure the required thickness, said plies containing alternately sulphur and an accelerator.

26. The herein described method of forming a vulcanized rubber compound which comprises bringing together a plurality of plies of rubber, adjoining plies containing respectively ingredients which are migratory under moderate heat but which plies are individually non-vulcanizable under such moderate heat, and thereafter raising the temperature of the adjoined plies to effect migration of the ingredients and vulcanization of the article.

27. The herein described method of forming a vulcanized rubber sheet or slab which comprises mixing separate batches of rubber compound, one batch containing sulphur and another batch an accelerator, separately calendering said batches into sheets and thereafter superposing said sheets and vulcanizing them together.

28. A process of treating rubber which comprises combining in at least two superposed layers of rubber, materials comprising sulphur, a migratory organic accelerator, and metal in combination, at least two of the materials being combined with one of said layers of rubber, and subjecting to a vulcanizing temperature.

29. A process of treating rubber which comprises combining in at least two superposed layers of rubber, materials comprising sulphur, a migratory vulcanization accelerator which is a derivative of carbon disulphide, and zinc in combination, at least two of the materials being combined with one of said layers of rubber, and subjecting to a suitable vulcanizing temperature.

30. A process of treating rubber which comprises combining in at least two superposed layers of rubber, materials comprising sulphur, a migratory vulcanization accelerator which is a derivative of carbon disulphide, zinc in combination, and an amine, at least two of the materials being combined with one of said layers of rubber, and subjecting to a suitable vulcanizing temperature.

31. A process of treating rubber which comprises disposing in desired form a body of rubber containing part of a powerful vulcanizing combination which includes an organic accelerator and introducing the balance of said combination by diffusion.

32. A process of treating rubber which comprises aggregating in desired form a body of rubber and vulcanizing said body by the diffusion therein of complementary low temperature vulcanizing ingredients including an organic accelerator.

33. A process of treating rubber which comprises aggregating in desired form a body of rubber and vulcanizing said body by combining therein complementary vulcanizing ingredients by diffusion, said ingredients including an organic accelerator.

34. A process of producing vulcanized rubber which comprises introducing into rubber vulcanizing ingredients including sulphur, metal in combination, and an organic accelerator, forming the rubber stock as desired, and vulcanizing the stock while applying to the surface thereof a migratory ingredient adapted to supplement the vulcanizing action of the ingredients contained in the stock.

35. A process of producing vulcanized rubber which comprises preparing a stock containing rubber and some but less than the total ingredients of vulcanization, forming as desired, and vulcanizing in a medium containing an ingredient of vulcanization complementary to the ingredients of vulcanization in said stock, said total ingredients including an organic accelerator.

36. A process of forming a sheet or slab of rubber which comprises superposing one upon the other a plurality of plies of rubber compound, one ply containing sulphur and an adjoining ply an accelerator, causing sulphur to migrate into the ply containing the accelerator, and vulcanizing said last mentioned ply.

37. The method of forming a vulcanized rubber article which comprises superimposing one upon the other layers of rubber compound, one layer containing sulphur and an adjoining layer an organic accelerator, and subjecting the composite article to a suitable vulcanizing temperature.

38. A method of forming a sheet of vulcanizable rubber compound which comprises superimposing one upon the other layers of rubber compound, one layer containing part of a low temperature vulcanizing combination and an adjoining layer the balance of said combination and subjecting to a suitable vulcanizing temperature.

39. A process of producing vulcanized rubber which comprises preparing a stock containing rubber and less than the total ingredients adapted to form a low temperature vulcanizing combination which includes an organic accelerator, forming as desired, and vulcanizing said stock by the diffusion therein of the balance of said low temperature vulcanizing ingredients.

40. Process of producing vulcanized rubber which comprises incorporating with rubber less than the total of desired ingredients of vulcanization but including an organic accelerator, forming as desired, causing to migrate into the stock the balance of said ingredients of vulcanization and vulcanizing the rubber.

41. Process of forming a sheet or slab of rubber which comprises superposing one upon the other plies of rubber compound, one ply containing a migratory accelerator and an adjoining ply containing sulphur but not said accelerator, and vulcanizing.

42. A process of producing vulcanized rubber which comprises incorporating with rubber vulcanizing ingredients including sulphur, organic accelerator and metal in combination, forming as desired, and vulcanizing the stock in a medium containing a diffusible vulcanizing ingredient adapted to coact with the ingredients in the stock to supplement their vulcanizing action.

43. A process of producing vulcanized rubber which comprises incorporating with rubber vulcanizing ingredients including sulphur, an organic accelerator which is a derivative of carbon disulphide, and zinc oxide, shaping the rubber stock into desired form and vulcanizing the stock in a medium containing a diffusible vulcanizing ingredient adapted to coact with the ingredients in the stock to supplement their vulcanizing action.

44. Process of producing vulcanized rubber which comprises introducing into rubber, vulcanizing ingredients including sulphur, metal in combination, and an organic accelerator, shaping the rubber stock into desired form, applying to the surface thereof a migratory vulcanizing ingredient in gaseous form and subjecting the stock to a suitable temperature for a sufficient length of time to effect vulcanization.

45. The herein described method of forming a sheet or slab of rubber which comprises superposing one upon the other a plurality of plies of rubber compound, one ply containing sulphur and zinc oxide and an adjoining ply an accelerator in the presence of zinc oxide.

46. The hereinbefore described method of effecting the vulcanization of rubber compounds which comprises incorporating with the rubber compound one of two ingredients which will coact to effect vulcanization, applying the other ingredient to the surface of the rubber compound, one of said ingredients being organic, and thereafter causing the surface ingredient to penetrate the rubber and coact with the first named ingredient to effect vulcanization.

47. The hereinbefore described method of effecting the vulcanization of rubber compounds which comprises incorporating with the rubber compound one of two ingredients which will coact to effect low temperature vulcanization, applying the other ingredient to the surface of the rubber compound, and thereafter heating the rubber compound to cause the surface ingredient to flow and penetrate the rubber compounds.

48. The hereinbefore described method of effecting the vulcanization of rubber compounds which comprises incorporating with the rubber compound one of two ingredients which will coact to effect low temperature vulcanization, mixing the other ingredient with a suitable carrier and applying it to the surface of the rubber compound, and thereafter heating the compound.

49. A process of treating rubber which comprises introducing into rubber vulcanizing ingredients including sulphur, a vulcanization accelerator which is a derivative of carbon disulphide, metal in combination, and an amine, at least one of the named materials being introduced by diffusion, and vulcanizing the rubber.

50. A process of producing vulcanized rubber which comprises incorporating with rubber, vulcanizing ingredients including sulphur, organic accelerator, and zinc in combination, forming as desired, applying to the surface of the stock a migratory vulcanizing ingredient adapted to quicken the vulcanization of the rubber and subjecting to a suitable vulcanizing temperature.

51. The herein described method of effecting the vulcanization of rubber compounds which comprises incorporating with the compound a suitable proportion of sulphur, applying to the exterior thereof an organic accelerator, and causing the accelerator to penetrate the compound.

52. The herein described method of effecting the vulcanization of rubber compounds which comprises incorporating with the compound a suitable proportion of sulphur, applying to the exterior thereof an organic accelerator, and heating the compound to cause the accelerator to penetrate the compound.

53. A process of preparing compositions containing a vulcanizable plastic material, a vulcanizing agent, and an accelerator of vulcanization which comprises mixing the composition in separate batches with the vulcanizing agent and accelerator incorporated respectively in different batches, and combining the batches just prior to using the same.

54. A process of preparing compositions containing a vulcanizable plastic material, a vulcanizing agent, and an accelerator of vulcanization which comprises mixing the composition in separate plastic batches, one of which contains the vulcanizing agent but does not contain the accelerator, and mixing the batches just prior to using the same.

55. A process of preparing compositions containing rubber, sulphur, and an accelerator of vulcanization which comprises mixing the rubber in separate batches, one of which contains the sulphur but not the accelerator and the other of which contains the accelerator but not the sulphur, and mixing the batches just prior to using the same.

56. A process of producing vulcanized rubber composition which comprises forming separate batches of rubber composition, each batch containing relative to the other complementary low temperature vulcanizing ingredients, combining the batches when desired whereby there may be formed a complete low temperature vulcanizing combination and subjecting the combined batches to a vulcanizing temperature.

57. A process of preparing plastic compositions which will cure at relatively low temperatures which comprises milling a composition which may be vulcanized only at a high temperature until the plastic component thereof is broken down and combining therewith a non-vulcanizable plastic composition containing a vulcanization accelerator of the carbon bisulphide addition-product series.

58. The process of preparing low-temperature-curing compositions containing a plastic material which comprises combining a milled mixture containing a vulcanizing agent and a part of the plastic material, but not containing a vulcanization accelerator, with a non-vulcanizable milled mixture containing plastic material and an accelerator of vulcanization.

59. A process of preparing vulcanizable compositions which comprises milling the composition in separate batches with sulphur and an accelerator of vulcanization respectively incorporated in different batches, and milling the batches together at a lower temperature than is generated during the milling of the separate batches.

Signed at New York, New York, this 28th day of January, 1921.

SIDNEY M. CADWELL.